United States Patent [19]

Orii

[11] Patent Number: 4,463,980

[45] Date of Patent: Aug. 7, 1984

[54] VACUUM SUCTION APPARATUS

[76] Inventor: Masaru Orii, c/o Kabushiki Kaisha Orii Jidoki Seisakusho, 22-12 Haginaka, 3-Chome, Ohta-Ku, Tokyo, Japan

[21] Appl. No.: 354,021

[22] Filed: Mar. 2, 1982

[51] Int. Cl.³ ............................................... B66C 1/02
[52] U.S. Cl. ................................................. 294/64 R
[58] Field of Search ...................... 294/65, 64 R, 64 A, 294/64 B, 87 A; 414/30, 34, 118, 120, 121, 416, 733, 735, 736, 737; 198/689; 271/9, 91, 107

[56] References Cited

U.S. PATENT DOCUMENTS 2,890,077  6/1959  Littell .................................... 294/65
3,734,325  5/1973  Stone .................................. 294/64 R Primary Examiner—James B. Marbert
Attorney, Agent, or Firm—Kane, Dalsimer, Kane, Sullivan and Kurucz

[57] ABSTRACT

A vacuum suction apparatus for feeding a work piece to a press, removing the work piece that has been subjected to primary working, and feeding said work piece to the adjacent press for secondary working is disclosed.

The vacuum suction apparatus comprises two vacuum cups for holding a work piece to be pressed or a work piece that has been subjected to primary working, vacuum cup supporting means and an arm coupled to the vacuum cup supporting means by bolts. An air channel having two vacuum hose connecting holes and one communicating hole is formed in the interior of said vacuum cup supporting means. Another air channel having a vacuum hose connecting end and a communicating hole is formed in the interior of said arm. The vacuum hose connecting holes of the air channel in the cup supporting means are connected to vacuum hoses connected to the respective vacuum cups. The vacuum hose connecting hole of the air channel in the arm is connected to a vacuum hose connected to vacuum source. The communicating holes in the supporting means and arm face and are in alignment with each other and an annular packing is formed around either of the two communicating holes at the interface of the supporting means and arm.

1 Claim, 3 Drawing Figures

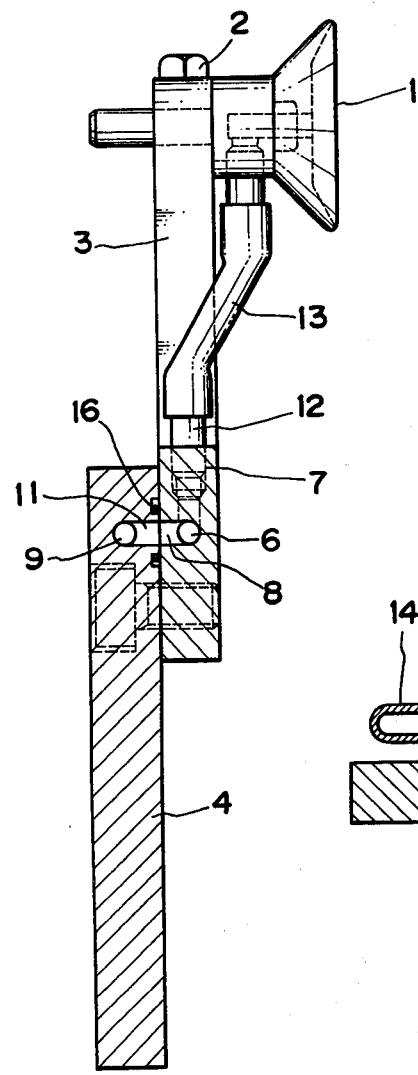
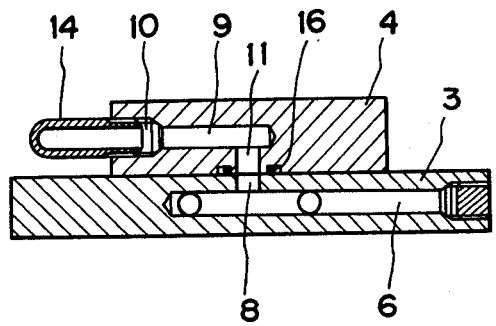
FIG. 2
FIG. 3

VACUUM SUCTION APPARATUS

FIELD OF THE INVENTION

The present invention relates to a vacuum suction apparatus for feeding a work piece to a press, removing the work piece that has been subjected to primary working, and feeding said work piece to the adjacent press for secondary working.

DESCRIPTION OF THE PRIOR ART

The conventional vacuum suction apparatus comprises vacuum cups for retaining a work piece or pressed work piece, means for supporting the vacuum cups, and an arm that is coupled to the supporting means and which is operated by a drive mechanism. The vacuum cups are directly connected to vacuum hoses, so when there is a need to change the type of the work piece to be pressed, not only the change of the vacuum supporting means but also reinstallation of a vacuum piping is necessary, and accomplishing these two things takes much time in the conventional system.

SUMMARY OF THE INVENTION

Therefore, the primary object of the present invention is to provide a vacuum suction apparatus for feeding and removing a work piece or primary-worked piece that needs only a short time for replacement of the vacuum cup supporting means in accordance with the type of the work piece to be pressed.

BRIEF DESCRIPTION OF THE DRAWING

FIG. 2 is a side elevational section taken on the line A—A of FIG. 1; and

FIG. 3 is a cross section taken on the line B—B of FIG. 1.

THE PREFERRED EMBODIMENT OF THE INVENTION

Figure 1:
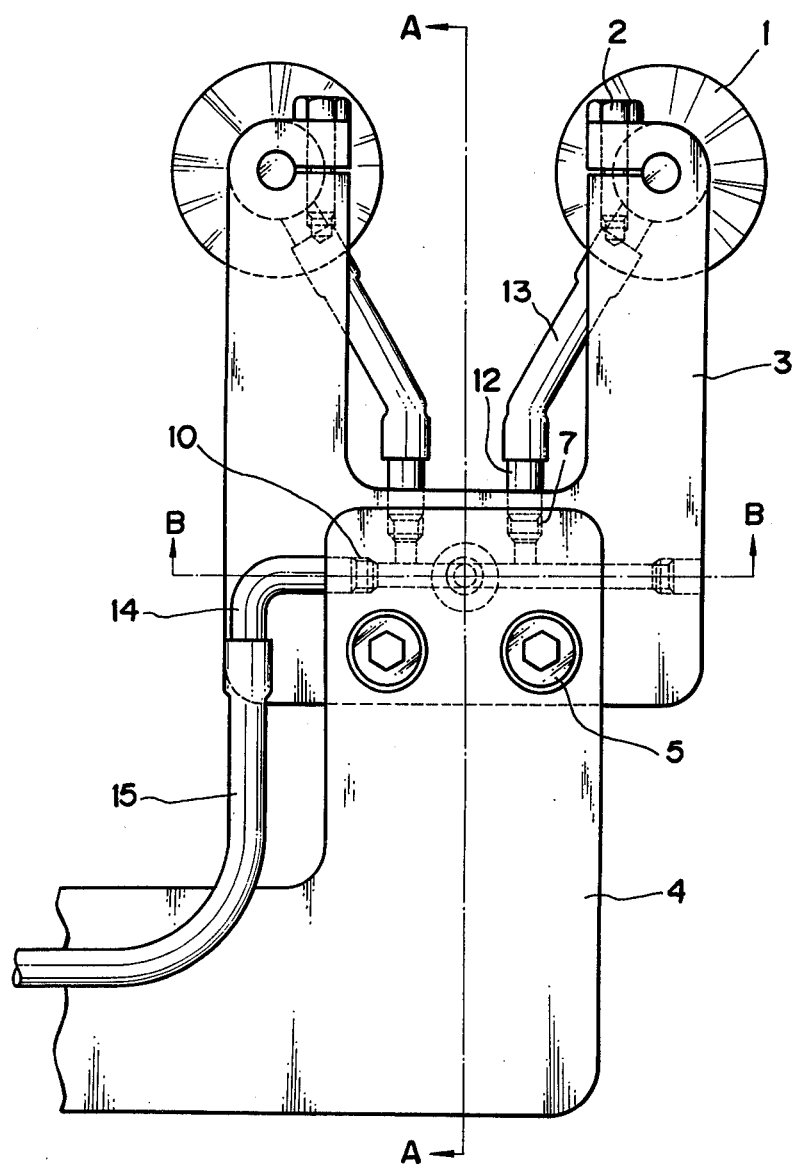
FIG. 1 is a plan view of a vacuum suction apparatus according to one embodiment of the present invention.

One embodiment of the apparatus of the present invention is hereunder described by reference to the accompanying drawing, wherein two vacuum cups (1) are connected to vacuum cup supporting means (3) by bolts (2). The supporting means (3) is fixedly secured to an arm (4) by bolts (5). The arm (4) is moved by a drive mechanism (not shown). An air channel (6) is formed in the interior of the supporting means (3). At two points of channel (6) is formed a hose connecting hole (7) and a communicaing hole (8) is formed between them. An air channel (9) is formed in the interior of the arm (4), and one end of the channel forms a hose connecting hole (10) and the other end forms a communication hole (11). Each of the hose connecting holes (7) is connected to one end of a vacuum hose (13) by a connecting element (12), and the other end of each hose (13) is connected to the vacuum cup (1). The hose connecting hole (10) is connected to one end of a vacuum hose (15) by a hose connecting element (14), and the other end of the hose (15) is connected to a vacuum source (not shown). The communicating hole (8) formed in the vacuum cup supporting means (3) faces and is in alignment with the communicating hole (11) formed in the arm (4), and an annular packing (16) is formed around the communicating hole (11) at the interface between the arm (4) and the supporting means (3).

When the vacuum cup supporting means (3) must be replaced by another supporting means because of a change in the type of the work piece to be pressed, the new supporting means (3) may simply be secured to the arm (4) by bolts (5): the communicating hole (8) establishes a communication with the hole (11) which is in register with the hole (8), and the annular packing (16) provides an airtight seal between the supporting means (3) and the arm (4). In this way, the cup supporting means (3) is secured to the arm (4), while at the same time, a vacuum system is established among the cups, supporting means and the arm. In the vacuum suction apparatus of the present invention an air channel is formed in both the vacuum cup supporting means and the arm, and the two channels are connected to the vacuum cups and a vacuum source, and when a new cup supporting means is secured to the arm by bolts, the two communicating boles of the air channels come into alighment with each other to establish a communication between the air channels. Accordingly, the securing the cup supporting means to the arm achieves establishment of a vacuum piping at the same time, thereby greatly reducing the time for replacement of the cup supporting means and establishement of a vacuum piping system that are necessary when the type of work piece to be pressed is to be changed.

What is claimed is:

1. A vacuum suction apparatus which is adapted to facilitate replacement of the vacuum cups while maintaining suction air communicaton, comprising: two vacuum cups, means for supporting the vacuum cups, and an arm coupled to the cup supporting means by bolts so that the supporting means and the vacuum cups are detachable from the arm, an air channel having two vacuum hose connecting holes and one communicating hole being formed in the interior of said cup supporting means, another air channel having a vacuum hose connecting end and a communicating hole being formed in the interior of said arm, the vacuum hose connecting holes of the air channel in the cup supporting means being connected to vacuum hoses connected to the respective vacuum cups, the vacuum hose connecting hole of the air channel in the arm being connected to a vacuum hose connected to a vacuum source, the communicating holes in the supporting means and arm facing and being in alignment with each other and adapted to align with communicating holes of a replacement support means, an annular packing being formed around either of the two communicating holes at the interface of the supporting means and arm.

* * * * *